United States Patent [19]

Bitar et al.

[11] Patent Number: 5,491,422
[45] Date of Patent: Feb. 13, 1996

[54] LINEAR POSITION SENSOR USING A COAXIAL RESONANT CAVITY

[75] Inventors: Ali A. Bitar, Peoria, Ill.; Charles W. Bowman, Escondido; Denny E. Morgan, San Diego, both of Calif.

[73] Assignee: Caterpillar Inc., Peoria, Ill.

[21] Appl. No.: 403,599

[22] Filed: Mar. 14, 1995

Related U.S. Application Data

[62] Division of Ser. No. 108,552, Dec. 23, 1991, Pat. No. 5,438,274.

[51] Int. Cl.$^6$ .......................... G01R 27/04; F15B 13/16
[52] U.S. Cl. .......................... 324/636; 91/361; 92/5 R
[58] Field of Search .......................... 324/635, 634, 324/633, 636; 91/361, 1, 459; 92/5 R

[56] References Cited

U.S. PATENT DOCUMENTS

| | | | |
|---|---|---|---|
| 3,589,177 | 6/1971 | Merlo | 73/116 |
| 3,726,191 | 4/1973 | Johnston et al. | 92/5 R |
| 4,321,946 | 3/1982 | Paulos et al. | 137/554 |
| 4,365,503 | 12/1982 | Ho et al. | 73/3 |
| 4,588,953 | 5/1986 | Krage | 324/636 |
| 4,689,553 | 8/1987 | Haddox | 324/636 |
| 4,737,705 | 4/1988 | Bitar | 324/636 |
| 4,757,745 | 7/1988 | Taplin | 91/361 |
| 4,854,218 | 8/1989 | Stoll | 91/1 |
| 4,901,628 | 2/1990 | Krage | 92/5 R |
| 4,952,916 | 8/1990 | Taplin | 91/361 |
| 4,987,823 | 1/1991 | Taplin et al. | 91/361 |
| 5,182,979 | 2/1993 | Morgan | 92/5 R |
| 5,325,063 | 6/1994 | Morgan | 324/535 |

*Primary Examiner*—Maura K. Regan
*Attorney, Agent, or Firm*—James R. Yee

[57] ABSTRACT

An apparatus (102) is for detecting the linear extension (position), velocity and acceleration of a hydraulic cylinder (108). The hydraulic cylinder (108) defines a variable length coaxial resonant cavity (112). Under the control of a controller (228), an RF transmitting section (114) and an RF receiving section (116) are used to determine the resonant frequency of the cavity. The resonant frequency of the cavity (112) is determined by comparing a received signal with a threshold and detecting slope intercept conditions.

6 Claims, 10 Drawing Sheets

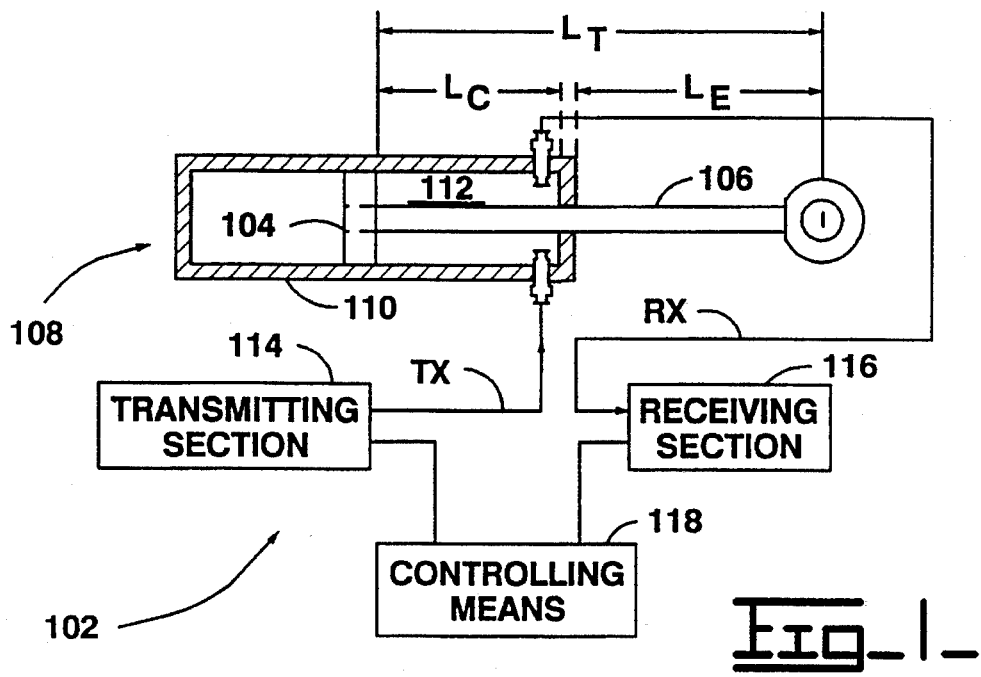
Fig_1_
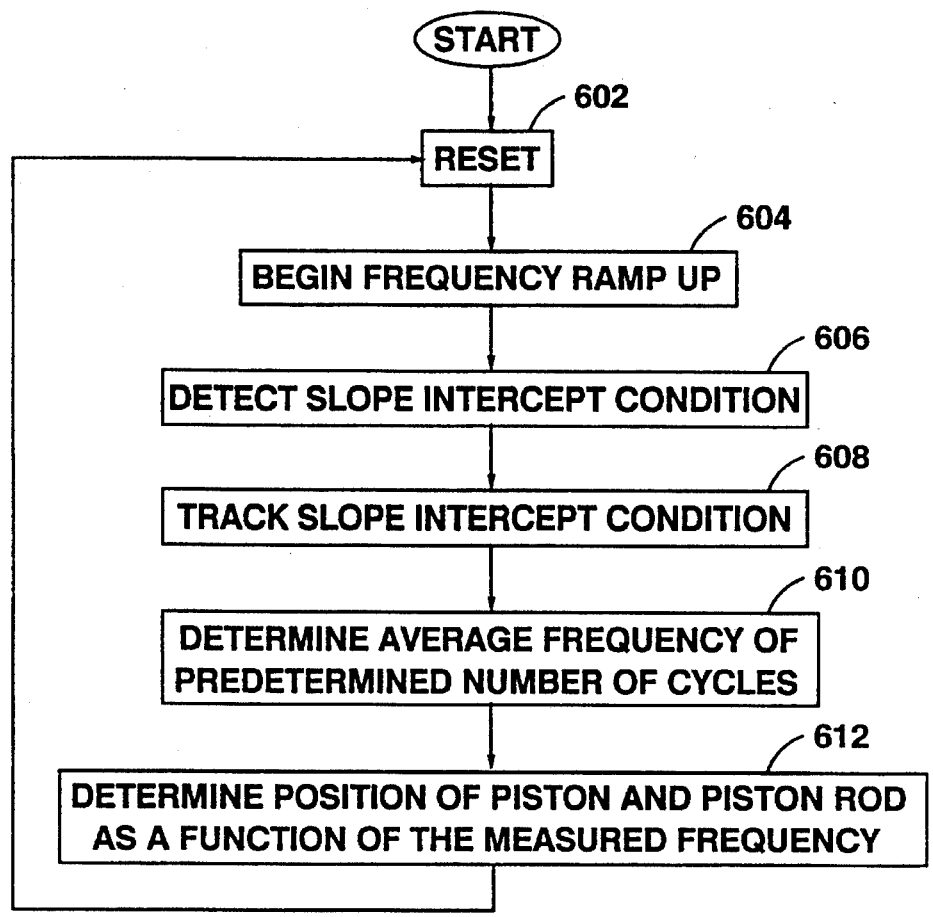
Fig_6_

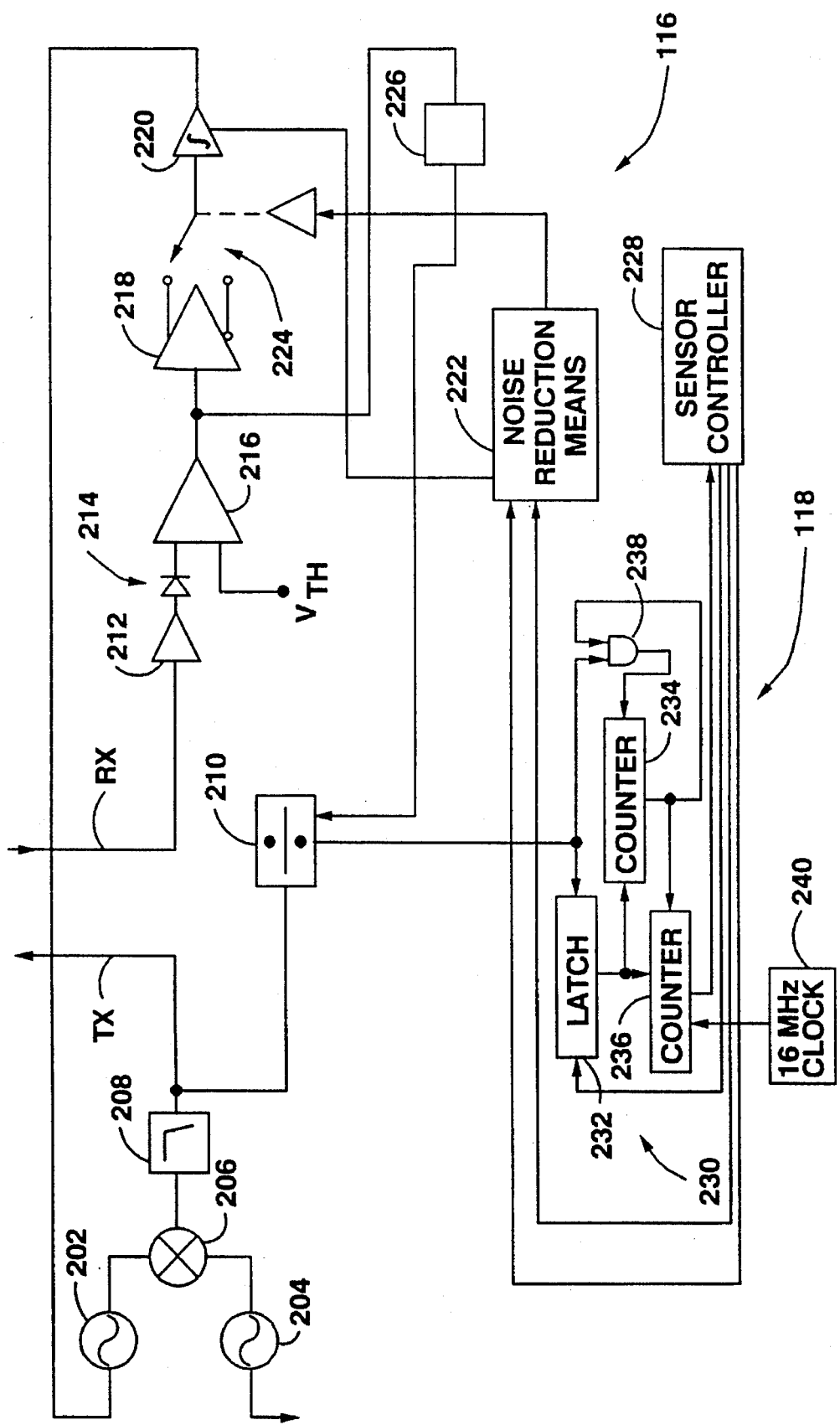

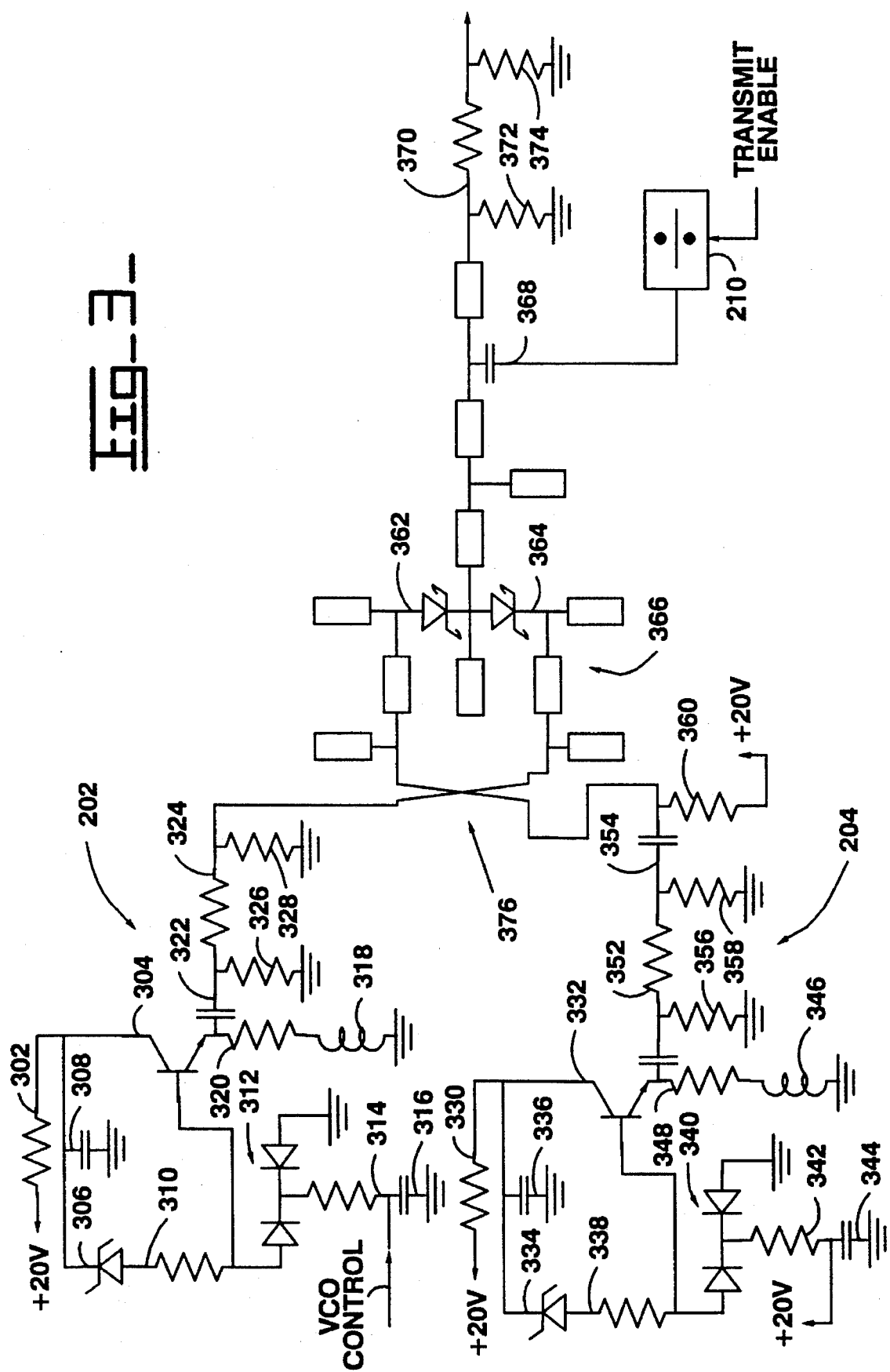

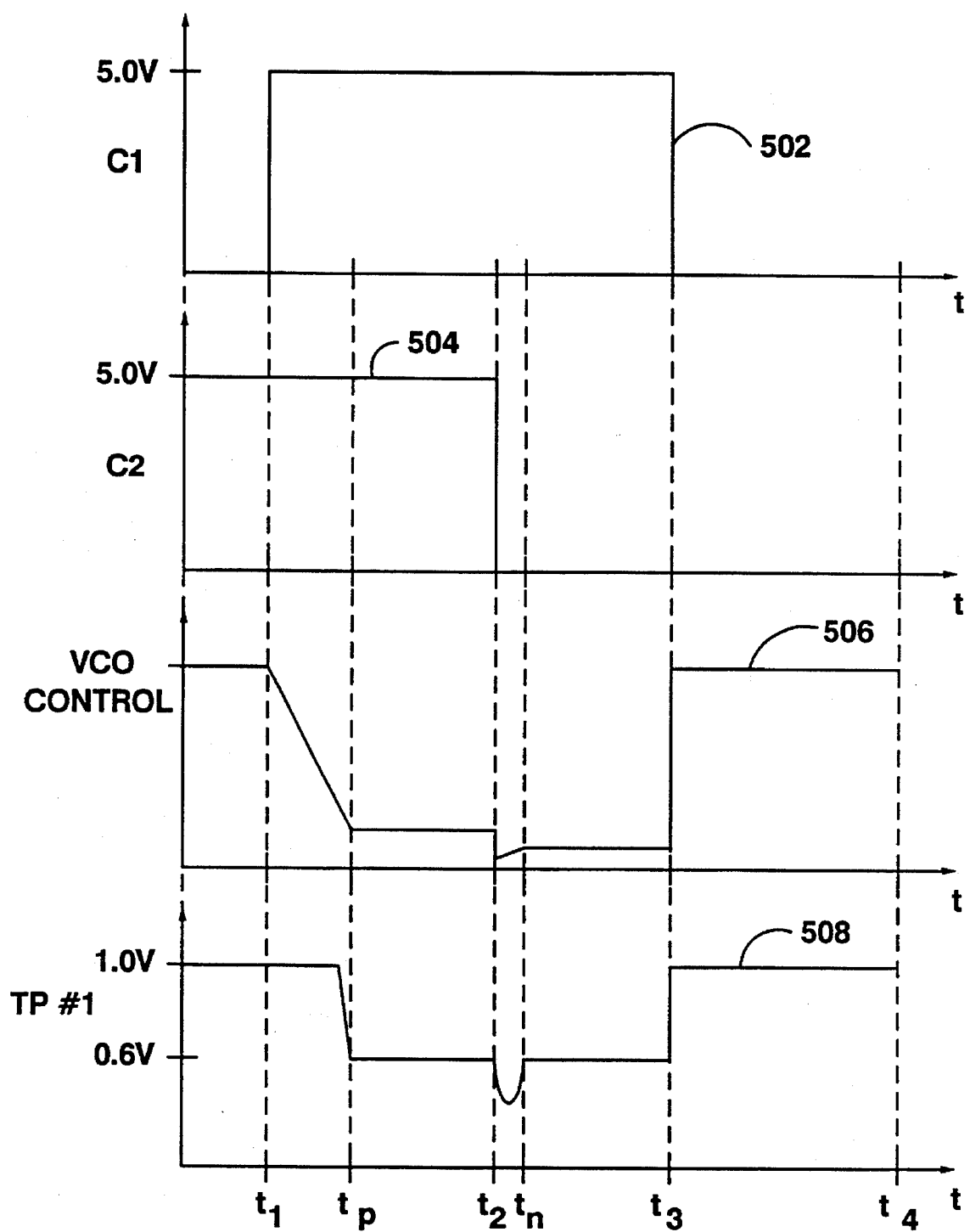
Fig_5_

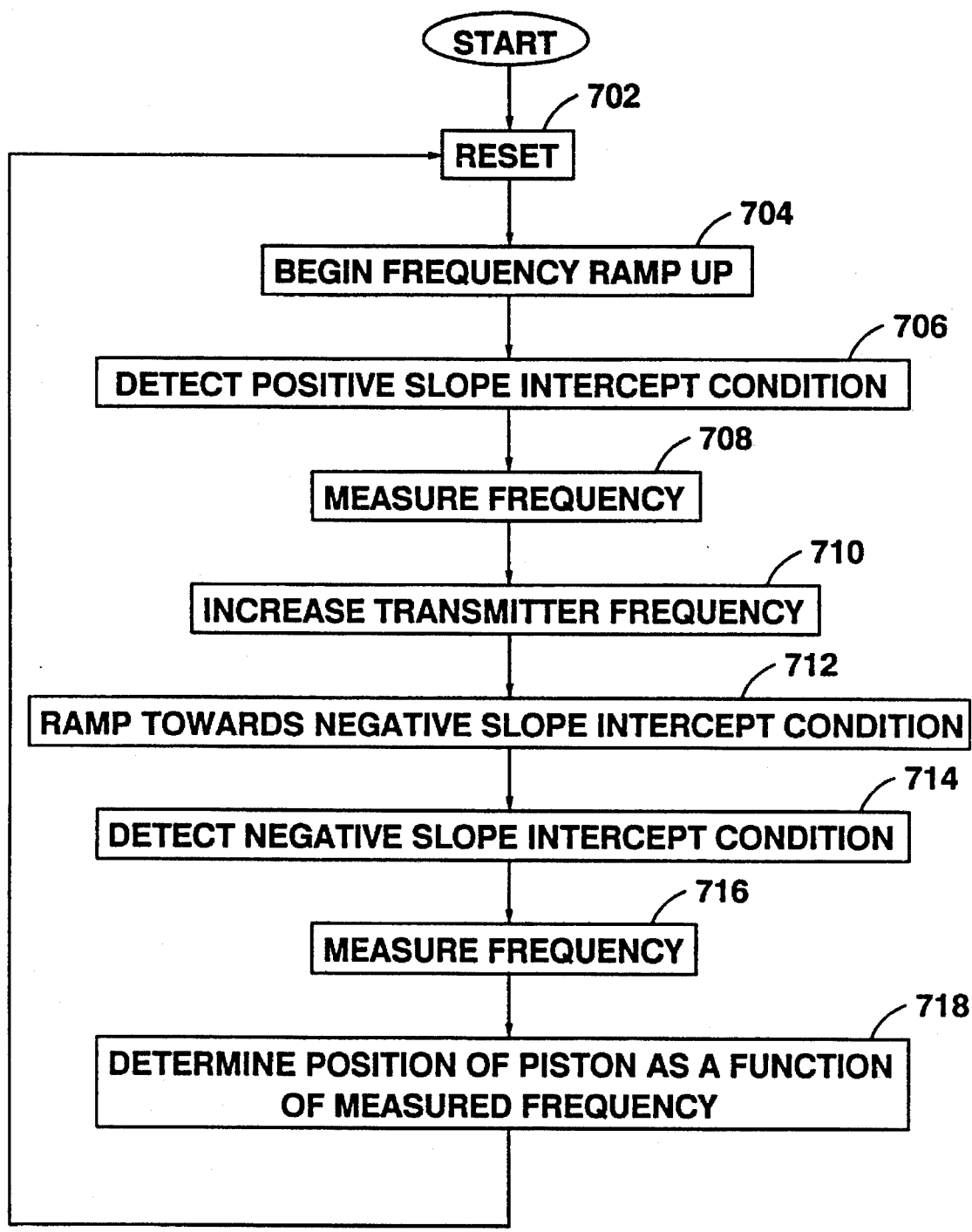
Fig_7_

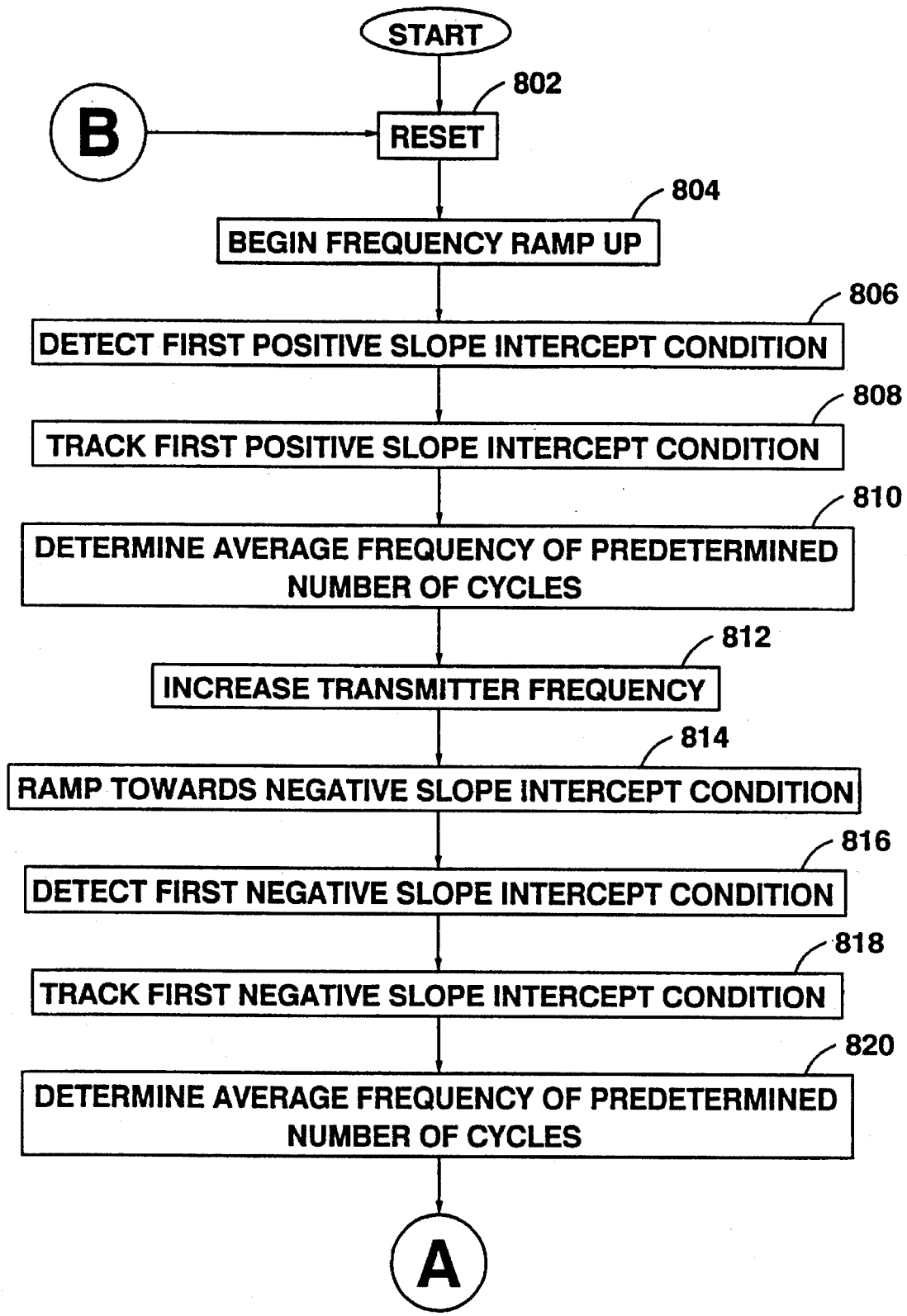
Fig_8A_

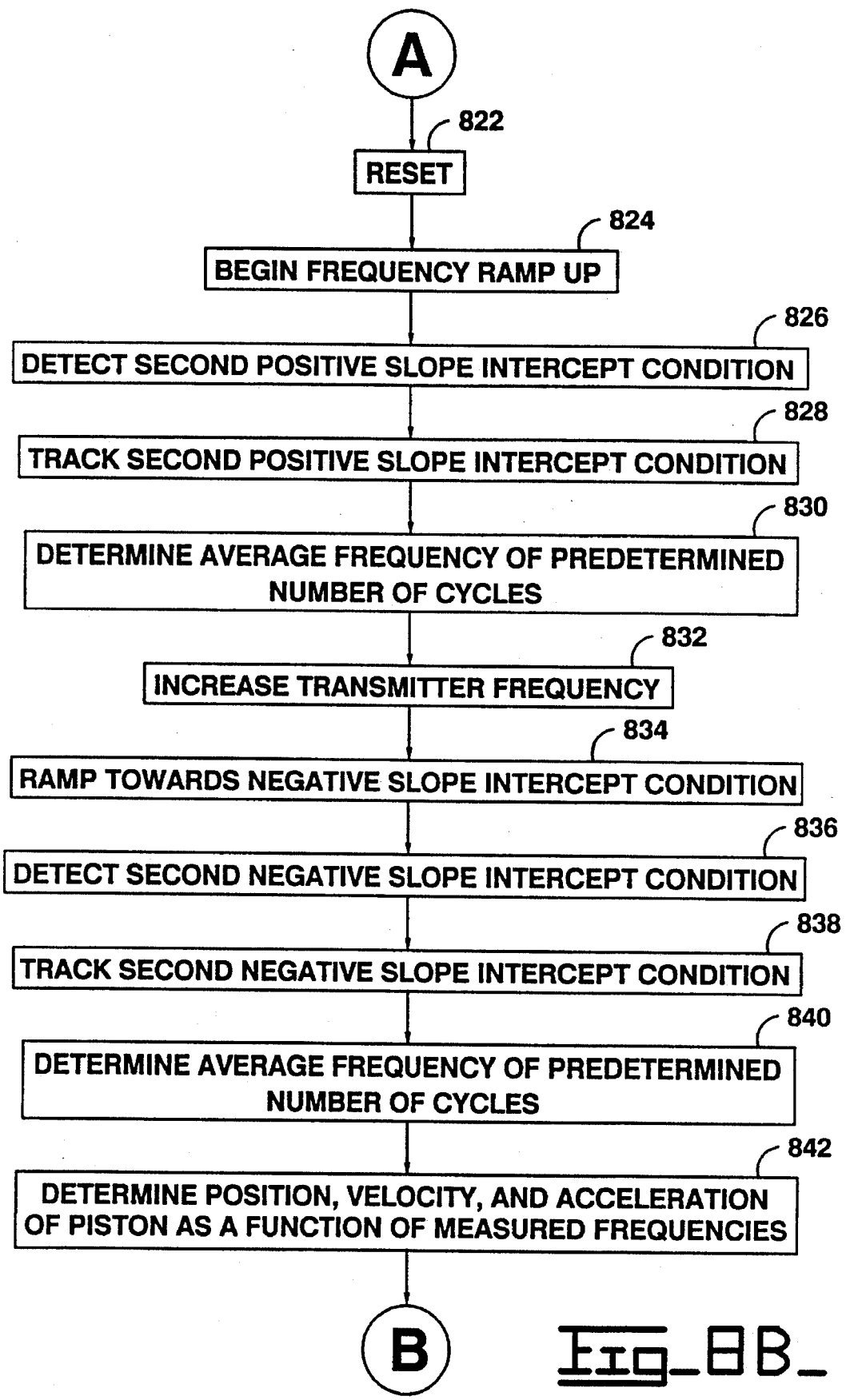

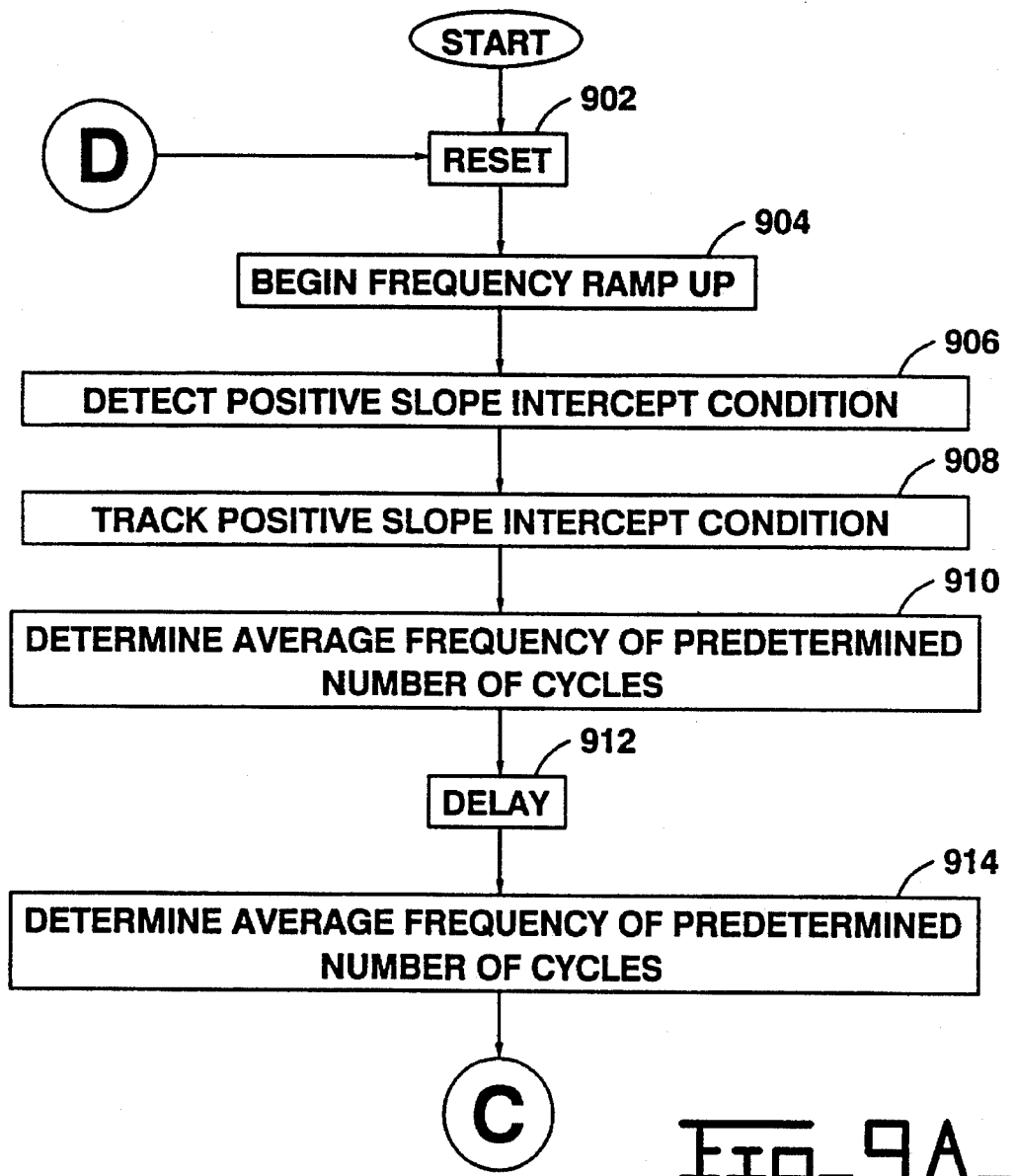
Fig_9A_
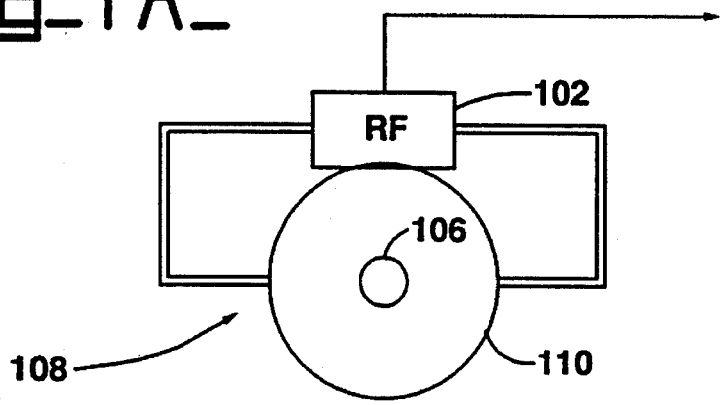
Fig_1A_

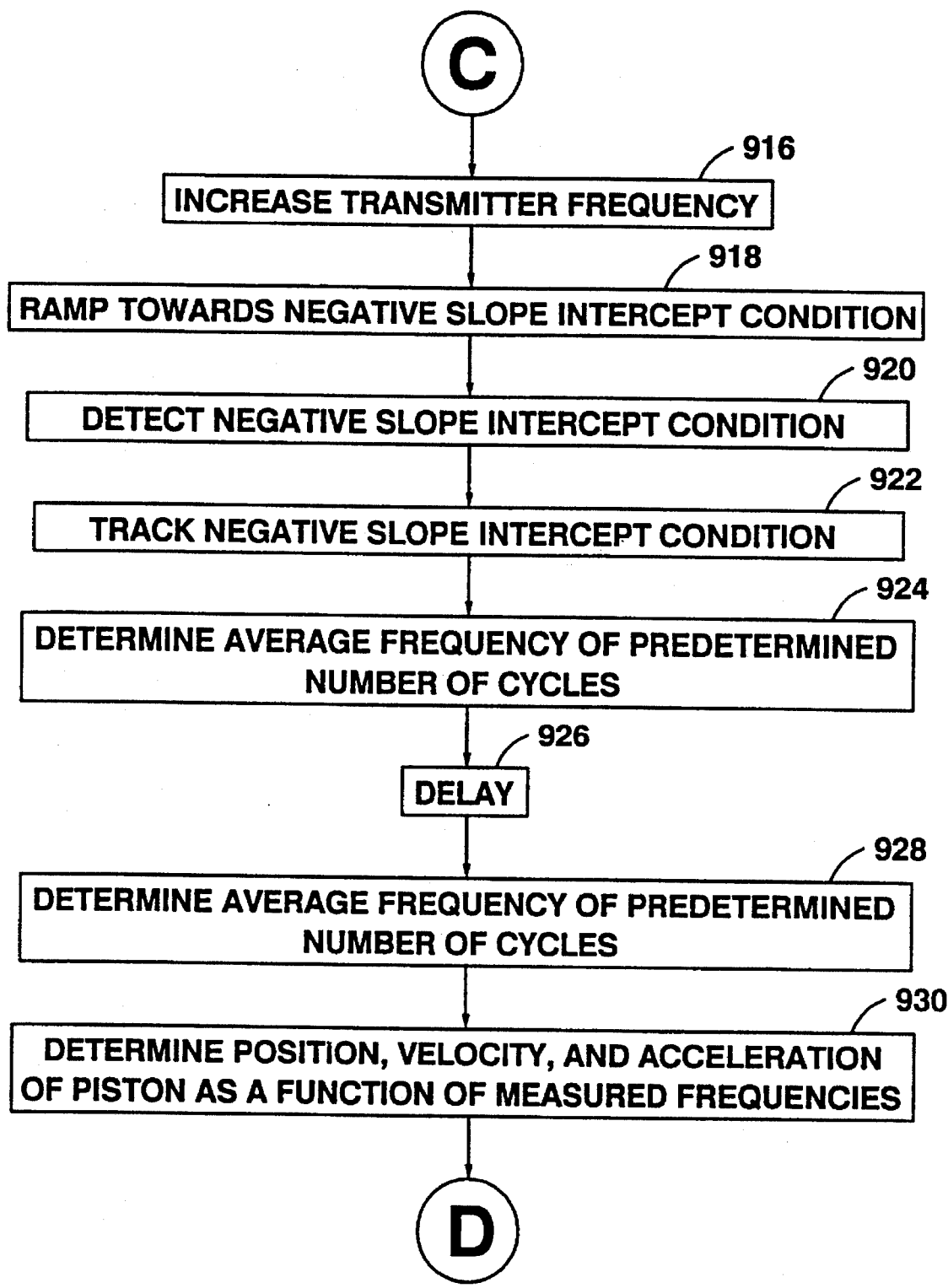
Fig-9B-

LINEAR POSITION SENSOR USING A COAXIAL RESONANT CAVITY

This is a divisional application of application Ser. No. 08/108,552, filed Dec. 23, 1991, of ALI A. BITAR; DENNY E. MORGAN; and CHARLES W. BOWMAN for LINEAR POSITION SENSOR USING A COAXIAL RESONANT CAVITY, now U.S. Pat. No. 5,438,274.

TECHNICAL FIELD

This invention relates generally to an apparatus and a method for determining the position of a piston and piston rod within a housing and, more particularly, to an apparatus and a method for determining the piston's position using radio frequency (RF) signals.

BACKGROUND ART

In the field of hydraulic cylinders, a variety of systems have been proposed in which the displacement of the elements of the cylinder is electrically sensed and displayed or used to perform control functions. Conventional transducers have serious deficiencies, owing in part to difficulties in mounting the units and the harsh environmental conditions to which they are exposed. Transducers used on hydraulic systems in the heavy equipment industry are particularly subject to damage from the severe work environment. Hydraulic cylinders are typically located in relatively unprotected areas and are subject to, for example, high g-forces, wide temperature variations, dust, water, debris, etc., which can result in both electrical and mechanical failure.

One attempt to provide a sensor which is particularly suitable for the heavy equipment industry uses radio frequency (RF) signals. One such system is disclosed in U.S. Pat. No. 4,737,705 issued Apr. 12, 1988 to Bitar, et al. Bitar transmits a ramping RF signal into a coaxial resonant cavity formed by the hydraulic cylinder. When the cylinder's resonant frequency is transmitted, the signal detected by a receiving antenna reaches a peak. The resonant frequency has a one to one relationship with the cylinder's extension. Thus, by determining the cylinder's resonant frequency, the cylinder's linear extension can be determined.

The peak of the received signal is detected through comparison with a threshold value. The resonant frequency is determined by modifying the measured frequency of the transmitted signal to adjust for the difference between the threshold and the actual peak. This adjustment adds error into the position determination since the difference between the transmitted signal and the actual resonant frequency varies with the resonant frequency, the accuracy of the threshold value, and the size and shape of the cylinder.

The frequency of the transmitted signal is measured by determining the period of a number of cycles of the transmitted signal. When the threshold is reached, Bitar keeps the frequency constant. This also adds error since the extension of the cylinder may be changing, thereby also changing the resonant frequency of the cavity. Additionally, error is introduced by noise in the system and frequency drift of the transmitter.

Furthermore, Bitar determines the linear position of the cylinder by cycling through a frequency range until the resonant frequency is determined. One position determination is accomplished each cycle. By taking the derivative of the position, the velocity and acceleration of the piston can be determined. However, the values determined in this manner are averages over the time period required to receive two position values. For example, if the cylinder's position is updated every second, then the determined velocity is an average velocity for that second.

In some applications, it is desirable to have velocity and acceleration data with higher resolution, that is, on the same or similar time basis as the position data.

The present invention is directed at overcoming one or more of the problems as set forth above.

DISCLOSURE OF THE INVENTION

In one aspect of the present invention, an apparatus for detecting a linear position of a piston and a piston rod is provided. The piston and piston rod are movable within a housing and define a variable length coaxial resonant cavity. A transmitting section produces an electromagnetic signal and delivers the electromagnetic signal into the resonant cavity. The electromagnetic signal has a frequency which varies between predetermined minimum and maximum values. A receiving section senses an electromagnetic wave signal within the coaxial cavity and detects a slope intercept condition of the electromagnetic wave signal. A sensor controller determines the position of the piston and piston rod as a function of the slope intercept condition.

In another aspect of the present invention, a method for detecting a linear position of a piston and a piston rod is provided. The piston and piston rod are movable within a housing and define a variable length coaxial resonant cavity. The method includes the steps of delivering an electromagnetic signal into the coaxial resonant cavity, receiving electromagnetic wave signals from said coaxial resonant cavity, detecting a slope intercept condition and responsively determining the position of the piston and piston rod.

BRIEF DESCRIPTION OF THE DRAWINGS

FIG. 1 illustrates a block diagram of a radio frequency (RF) linear position sensor, according to an embodiment of the present invention having a transmitting section, a receiving section, and a controlling means;

FIG. 1A is a block diagram of the RF position sensor of FIG. 1, wherein the RF transmitting and receiving sections are mounted on a hydraulic cylinder;

FIG. 2 illustrates a more detailed functional block diagram of the RF linear position sensor, according to the embodiment of the present invention of FIG. 1;

FIG. 3 is an electrical schematic of the transmitting section of FIG. 2;

FIG. 5 is a partial timing diagram of the RF linear position sensor, according to a preferred embodiment of the present invention;

FIG. 6 is a flow diagram illustrating the operation of the RF linear position sensor, according to one embodiment of the present invention;

FIG. 7 is a flow diagram illustrating the operation of the RF linear position sensor, according to another embodiment of the present invention;

FIG. 8A is a first portion of a flow diagram illustrating the operation of the RF linear position sensor, according to the preferred embodiment of the present invention;

FIG. 8B is a second portion of the flow diagram of FIG. 8A;

FIG. 9A is a first portion of a flow diagram illustrating the operation of the RF linear position sensor, according to alternate preferred embodiment of the present invention; and FIG. 9B is a second portion of the flow diagram of FIG. 9A.

BEST MODE FOR CARRYING OUT THE INVENTION

Figure 4:
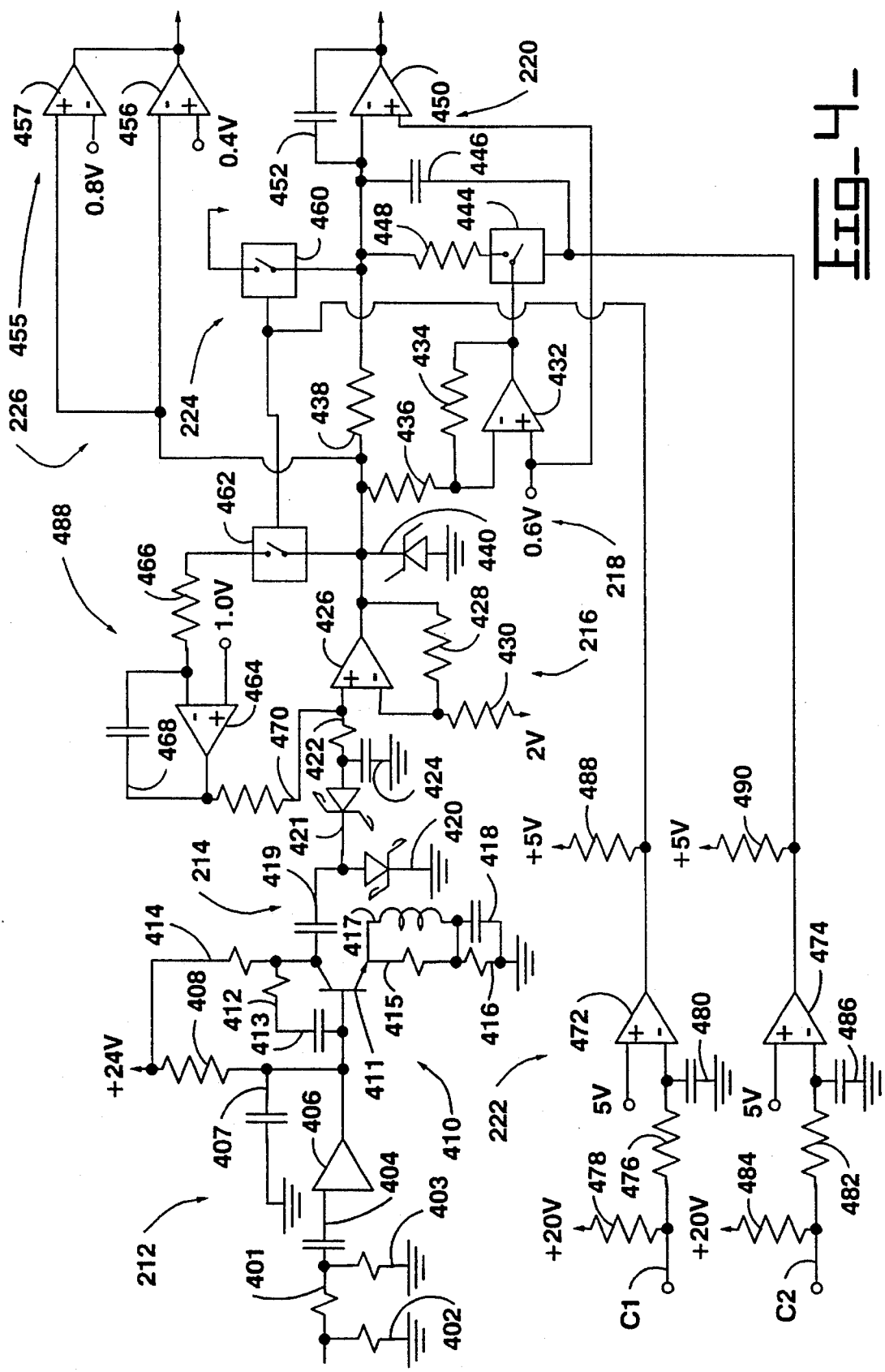
FIG. 4 is an electrical schematic of the receiving section of FIG. 2.

With reference to FIG. 1, the present invention, apparatus, or RF linear position sensor 102, is adapted to determine the position of a piston 104 and a piston rod 106 of a conventional hydraulic cylinder 108. As is discussed below, the apparatus 102 may also be used to determine the velocity and acceleration of the piston 104 and piston rod 106.

The piston rod 106 has a total length, $L_T$, and is movable within a housing 110 of the hydraulic cylinder 108. The piston rod 106 and the housing 110 form a variable coaxial cavity 112.

The length of the cavity 112, $L_C$, is equivalent to the total length, $L_T$, minus the length of the extended portion of the piston rod 106, $L_E$, plus the thickness of the end wall of the housing 110. Thus, by determining the length of the cavity, $L_C$, the extended length, $L_E$, can be directly derived and used as an indicator of the extension of the piston rod 106. The apparatus 102 detects the position of the piston 104 and piston rod 106 relative to the housing 110 for the purpose of either directly displaying the detected position or for use in a system which seeks to control the position of, for example, a work implement of a construction vehicle.

A means 114 or transmitting section produces an electromagnetic signal and delivers the electromagnetic signal into the coaxial resonant cavity 112. The electromagnetic signal has a frequency which varies between a predetermined minimum and a predetermined maximum value, for example, 50 megahertz (MHz) to 1.6 gigahertz (GHz). The transmitting section 114 includes a coupling element 122. The coupling element 122 may include an antenna, an electric or a magnetic field probe or a direct connection to the piston rod 106. Preferably, the coupling element 122 is a loop antenna. The loop antenna 122 may enter the cavity 112 from the cylinder head or the cylinder wall. In one embodiment, the loop antenna 122 enters the cavity 112 and is electrically connected to the inner surface of the side wall of the housing 110 or the cylinder head. In another embodiment, the loop antenna 122 enters the cavity 112 and is electrically connected to the piston rod 106.

A means 116 or receiving section senses an electromagnetic wave signal from within the coaxial cavity 112. The means 116 detects a slope intercept condition (between the received signal and the threshold) of the electromagnetic wave signal and produces a frequency signal in response to the frequency of the electromagnetic signal corresponding to the slope condition. A slope intercept condition is defined as the intercept between the detected voltage vs. frequency curve and the threshold voltage.

In one embodiment, the means 116 detects a positive slope intercept condition and responsively produces a first frequency signal and subsequently detects a negative slope intercept condition and responsively produces a second frequency signal. A positive slope intercept condition occurs on the low side of the resonant frequency. A positive slope intercept condition occurs on the low frequency side of the resonance and a negative slope intercept condition occurs on the high frequency side of the resonance.

In another embodiment, the means 116 detects a slope intercept condition of the electromagnetic wave signal, tracks the frequency of the slope intercept condition and responsively produces a first frequency signal. The receiving section 116 includes a receiving coupling element 120. Preferably, the receiving coupling element 120 is a loop antenna, as described above.

A controlling means 118 receives the frequency signals and responsively determines the position of the piston and piston rod 104,106. Additionally, the position determining means 118 includes means for determining the velocity and acceleration of the piston and piston rod 104,106, as is discussed below.

The coaxial resonant cavity 112 has a response similar to a coaxial transmission line with shorted ends. The hydraulic cylinder 108 includes an electrically conductive ring (not shown) to provide electrical connection between the housing 110 and the piston rod 106.

When excited by radio frequency (RF) signal, the cavity 112 has a high insertion loss except near resonant frequencies. More specifically, if the length, $L_C$, of the cavity 112 is an integer multiple of half the wave length of the signal delivered into the coaxial cavity 112, then some RF energy is coupled into the cavity 112 exciting a transverse electromagnetic (TEM) field which can best be described as the superposition of two waves propagating along the coaxial cavity 112. The presence of this time varying electromagnetic field in the cavity 112 causes the receiving coupling element 120 to detect a signal of the same frequency. Each integer multiple is known as a harmonic or resonant frequency.

The resonant frequency of an ideal coaxial cavity is given by the equation:

$$f_{res} = \frac{n}{2}\left(\frac{c}{(E_r)^{1/2}} * \frac{1}{L_c}\right) \quad (n = 1, 2, 3 \ldots)$$ EQU. 1 where $C=3\times10^{10}$ cm/s, $f_{res}$ is the excitation frequency, and $E_r$ is the relative permittivity of the fluid within the cavity. The first harmonic corresponds to n=1, the second harmonic corresponds to n=2, etc.

The resonant frequency of the coaxial cavity 112 differs from that of the ideal equation owing to deviations in the geometry of the cavity 112, and from the effect of the actual coupling structure. However, a one-to-one relationship exists between the actual resonant frequency of the cavity 112 and the length of the cylinder, $L_C$, such that deviations from the ideal cavity may be accounted for by calibrating each hydraulic cylinder family type.

In one embodiment, the position determining means 118 determines the position of the piston and piston rod 104,106 by determining the resonant frequency of the coaxial resonant cavity 112. The resonant frequency of the coaxial resonant cavity 112 is a function of the frequency signals. In the preferred embodiment, the present invention measures frequency be measuring the periods.

For example, in one embodiment, the receiving section 116 tracks the frequency of the positive slope intercept (as described below). The frequency is then adjusted to account for the difference between the threshold value and actual resonance. The adjusted value is then used as the resonant frequency of the coaxial cavity 112.

In another example, the period of the resonant frequency is determined as a function of the first and second frequency signals (corresponding to the positive and negative slope intercept conditions, respectively). Generally:

$$P_{res} = f(P_1 + P_1)$$ EQU. 2 where, $P_1$ and $P_2$ are the measured periods corresponding to the first and second frequency signals, $f_1$ and $f_2$. In one embodiment, the period of the resonant frequency is given by the equation:

$$P_{res}=(P_1+P_1)/2. \qquad \text{EQU. 2A}$$

In another embodiment, the period of the resonant frequency is given by the equation:

$$P_{res} = (P_1+P_1)/2 + \frac{P_u - (P_u^2 + (P_1 - P_2)^2)^{1/2}}{2} \qquad \text{EQU. 2B}$$

where $P_u$ is a parameter based upon cylinder dimensions and position.

With reference to FIG. 1A, in the preferred embodiment, the transmitting and receiving sections 114,116 are mounted to or near the hydraulic cylinder 108. This allows the transmitting and receiving sections 114,116 to be connected to the coupling elements 120,122 by stiff coaxial cables. The controlling means 118 is preferably located at a central location and connected to the transmitting and receiving sections 114,116 by a twisted wire pair.

With reference to FIG. 2, a block diagram of the transmitting section 114 and the receiving section 116 according to the preferred embodiment, is shown. The transmitting section includes first and second voltage controlled oscillators (VCO) 202,204. A balanced mixer 206 combines the output of the first and second VCO's 202,204. A lowpass filter 208 connects the output of the mixer 206 to the transmitting coupling element 122. An RF amplifier (not shown) may be needed to amplify the output of the lowpass filter 208.

The receiving section 116 includes an RF amplifying/equalizing means 212 for amplifying the signal from the receiving coupling element 120.

A prescaler 210 scales the frequency of the output of the lowpass filter 208. In the preferred embodiment, the prescaler 210 divides the frequency of the output of the low pass filter 208 by 256 and responsively produces a frequency signal.

A means 214 receives the output of the RF amplifier/equalizer 210 and responsively produces a detected signal indicative of the amplitude of the electromagnetic wave signal.

An amplifying means 216 amplifies the output of the detecting means 214 compared with a predetermined value or threshold, $V_{TH}$.

An invert/non-invert amplifying means 218 amplifies the output of the RF amplifier/equalizer 210 and provides an inverted output and a non-inverted output.

An integrating means 220 integrates the output of the invert/non-invert amplifier 218.

A means 222 receives control signals from the controlling means 118 and conditions the signals, that is, filtering and noise reduction.

A switching means 224 switches between the inverting and non-inverting outputs of the amplifier 218.

A lock detecting means 226 signals the controlling means 118 when frequency lock occurs.

The controlling means 118 includes a sensor controller 228 and a counting means 230. In the preferred embodiment, the sensor controller 228 is microprocessor based. One suitable microprocessor is available from Motorola Inc. of Roselle, Ill. as part no. MC68HC11. In the preferred embodiment, the microprocessor is adapted to receive information from the counting means 230, determine the position, velocity, and acceleration of the piston and piston rod 104,106, and relay the data to an external user.

For example, in an automatic control position system for a construction vehicle, the position and/or velocity and/or acceleration of the piston and piston rod 104,106 are used to control the position/movement of the vehicle's linkage. Typically, a separate control system is used.

In the preferred embodiment, the counting means 230 counts the output pulses of the prescaler 210. In the preferred embodiment, the counting means 230 includes a latch or flip-flop 232, a first counter 234, a second counter 236, and an AND logic gate 238, as shown.

With reference to FIG. 3, an electrical schematic of the transmitting section 114 is shown. The first VCO 202 includes a first resistor 302 connected between positive 20 volts and the collector of a first NPN transistor 304. The collector of the first NPN transistor 304 is also connected to the cathode of a first Zener diode 306. In the preferred embodiment, the first Zener diode 306 has a breakdown voltage of 8.2 volts. A first capacitor 308 connects the junction of the first Zener diode 306 and the first NPN transistor 304 to electrical ground. The anode of the first Zener diode 306 is connected to the base of the first NPN transistor 304 through a second resistor 310. The base of the first NPN transistor 304 is also connected to electrical ground by a first diode pair 312. The junction of the first diode pair is also connected to electrical ground through a third resistor 314 and a second capacitor 316. The emitter of the first NPN transistor 304 is connected to electrical ground through a first inductor 318 and a fourth resistor 320. A third capacitor 322 is connected to the emitter of the first NPN transistor 304. A fifth resistor 324 connects the third capacitor 322 to the mixer 206. Six and seventh resistors connect opposite ends of the fifth resistor 324 to electrical ground. The frequency output of the first VCO is controlled by an analog signal (VCO Control) applied to the junction of the third resistor 314 and the second capacitor 316.

The second VCO 204 includes an eighth resistor 330 connected between positive 20 volts and the collector of a second NPN transistor 332. The cathode of a second Zener diode 334 is connected to the collector of the second NPN transistor 332. In the preferred embodiment, the second Zener diode 334 has a breakdown voltage of 8.2 volts. A fourth capacitor 336 connects the connector of the second NPN transistor 332 to electrical ground. A ninth resistor 336 connects the anode of the second Zener diode 334 to the base of the second NPN transistor 332. A second diode pair 340 connects the base of the second NPN transistor 332 to electrical ground. A tenth resistor 342 and a fifth capacitor 344 connect the junction of the second diode pair 340 to +20 volts. The emitter of the second NPN transistor 332 is connected to electrical ground through a second inductor 346 and an eleventh resistor 348 (100 ohms). A sixth capacitor 350, a twelfth resistor 352 and a seventh capacitor 354 connect the emitter of the second NPN transistor 332 to the mixer 206. Thirteen and fourteenth resistors 356,358 connect opposite ends of the twelfth resistor 352 to electrical ground. A fifteenth resistor 360 connects the junction of the seventh capacitor and the mixer 202 to positive twenty volts.

In the preferred embodiment, the two voltage controlled oscillators 202,204 are used to produce a signal that ranges from 50 megahertz (MHz) to 1800 megahertz. In the preferred embodiment the first VCO 202 has an output which varies from 1800 megahertz to 5000 megahertz and the second VCO 204 has a constant output of 5,000 megahertz.

In the preferred embodiment, the balanced mixer 206 includes first and second Schottky Barrier diodes 362,364 and a quadrature 3 db coupler 376. The In the preferred embodiment, the transmitting section is implemented on a printed circuit board. Printed matching and low pass filter networks 366 (shown as blocks) provide flat amplitude, good source VSWR and spectral purity at the output of the mixer 206.

An eighth capacitor 368 connects the mixer 206 to the prescaler 210.

A sixteenth resistor 370 connects the mixer 206 to the transmitting coupling element 122. Seventeenth and eighteenth resistors 372,374 connect opposite ends of the sixteenth resistor 370 to electrical ground. With reference to FIG. 4, an electrical schematic of the receiving section 116 is shown. A nineteenth resistor 401 connects the receiving coupling element 120 to a ninth capacitor 404. Twentieth and twenty-first resistors 402,403 connect opposite ends of the nineteenth resistor 401 to electrical ground. The ninth capacitor 404 is connected to the input of a first amplifier 406. A tenth capacitor connects the output of the first amplifier 406 to electrical ground. A twenty-second resistor 408 connects the output of the first amplifier 406 to positive 24 volts.

The detecting means 214 includes an equalizer circuit 410. In the preferred embodiment, the equalizer circuit 410 includes a third NPN transistor 411. A twenty-third resistor 412 and an eleventh capacitor 413 connected in series connects the collector of the third NPN transistor 411 to the base. A twenty-fourth resistor 414 connects the collector to +24 volts. Twenty-fifth and twenty-sixth resistors 415,416 connected in series connects the emitter of the third NPN transistor 411 to electrical ground. A third inductor 417 and a twelfth capacitor 418 are connected in parallel with the twenty-fifth and twenty-sixth resistors 415,416, respectively, as shown. A thirteenth capacitor 419 connects the equalizer circuit 410 to the rest of the detecting means 214.

The detecting means 214 further includes a third Schottky barrier diode 420 connected between the thirteenth capacitor 419 and electrical ground. A fourth Schottky barrier 421 is connected to the anode of the third Schottky barrier diode 420. The anode of the fourth Schottky barrier diode is connected to the first comparing means 216 through a twenty-seventh resistor 422. A fourteenth capacitor 423 connects the junction between the fourth Schottky barrier diode 421 and the twenty-seventh resistor 422 to electrical ground.

The first comparing means 216 includes a first operational amplifier 426. A twenty-eighth resistor 428 connects the output of the first operational amplifier 426 to the negative input terminal of the first operational amplifier 426. A twenty-ninth resistor 430 connects the negative input terminal to +2 volts.

The inverting/non-inverting amplifying means 218 includes a second operational amplifier 432. A thirtieth resistor 434 connects the output of the second operational amplifier 432 to the negative input terminal of the operational amplifier 432. A thirty-first resistor 436 connects the output of the first operational amplifier 426 to the negative input terminal of the second operational amplifier 432. The positive input terminal of the second operational amplifier 432 is connected to 0.6 volts. A thirty-second resistor 438 connects the output of the first operational amplifier 426 with the integrating means 220. A third Zener diode 440 connects the output of the first Op Amp 426 to electrical ground.

The output of the second operational amplifier 432 is connected to the output terminal of a first switch 444. The control terminal of the first switch 444 is connected to the integrating means 220 by a fifteenth capacitor 446. The input terminal of the first switch 444 is connected to the integrating means 220 by a thirty-fourth 448.

The integrating means 220 includes a third operational amplifier 450. A sixteenth capacitor 452 connects the output of the third operational amplifier 450 to the negative input terminal of the operational amplifier 450. The positive input terminal of the third operational amplifier 450 is connected to 0.6 volts.

The lock detect means 226 includes a window comparator 455. In the preferred embodiment, the window comparator 455 includes first and second comparators 456,457. The negative input terminal of the first comparator 456 is connected to 0.4 volts. The positive input terminal of the second comparator 457 is connected to 0.8 volts. The positive input terminal of the first comparator 456 and the negative input terminal of the second comparator 457 are connected to the output of the first operational amplifier 426.

The switching means 224 includes second and third switches 460,462. The control terminals of the second and third switches 460,462 are connected to the noise reduction means 222. The input terminal of the second switch 460 is connected to electrical ground. The output terminal of the second switch 460 is connected to the negative input terminal of the third Op Amp 450. The input terminal of the third switch 462 is connected to the negative input terminal of a fourth operational amplifier 464 through a thirty-sixth resistor 466. The output terminal of the third switch 462 is connected to the output of the first Op Amp. The positive input terminal of the fourth operational amplifier 464 is connected to 1 volt. The output of the fourth operational amplifier 464 is connected to the negative input terminal by a fifteenth capacitor 468. The output of the fourth operational amplifier 464 is also connected to its positive input terminal of the first operational amplifier by a thirty-seventh resistor 470.

The noise reduction means 222 includes third and fourth comparators 472,474. The positive input terminal of the third and fourth comparators 472,474 are connected to positive 5 volts. A thirty-eighth resistor 476 connects the negative input terminal of the third comparator 472 to a reset input line. A thirty-ninth resistor 478 connects the reset input line to +20 volts. An eighteenth capacitor 480 connects the negative input terminal of the third comparator 472 to electrical ground. A fortieth resistor 482 connects the negative input terminal of the fourth comparator 474 to a slope input line. A forty-first resistor 484 connects the slope input line to positive +20 volts. A nineteenth capacitor 486 connects the negative input terminal of the fourth comparator 474 to electrical ground.

The sensor controller 228 controls the operation of the sensor 102 through the control lines, C1 and C2.

With reference to FIG. 6, in one embodiment of the present invention, the sensor 102 detects a slope intercept condition, tracks the frequency of the slope intercept condition and determines the position of the piston 104 as a function of the frequency.

In a first control block 602, the sensor 102 is reset (RESET). At RESET, the integrating means 220 is reset. An autozero feedback loop 488 is enabled and the output of the first Op Amp 424 is set to approximately 1.0 volt, indicating the absence of any detected signal. The autozero loop 488 adjusts the bias to the third Schottky diode 422 to give a constant 1.0 volts to the first Op Amp 426, independent of temperature. In a first embodiment, the autozero loop 488 includes a minimal feedback integrated circuit (mmic). In a second embodiment, the autozero loop 488 includes a bipolar transistor with autobias.

In a second control block 604, an electromagnetic signal is transmitted into the coaxial cavity 112. The frequency of the signal begins at predetermined minimum value, preferably approximately 50 MHz and increases toward a predetermined maximum value. The rate of increase is determined by the integrating means 220 and the first and second VCOs 202,204.

In a third control block 606, a slope intercept condition is detected, that is, the magnitude of the signal received from the receiving coupling element 120 is substantially equal to or greater than a predetermined threshold value, $V_{TH}$.

In a first embodiment, the predetermined threshold value, $V_{TH}$, is constant. In a second embodiment, the threshold value is set by the sensor controller 228 and may be of a function of one or more of the following: the size and type of cylinder, a previous position of the piston and piston rod 104,106, a previous velocity of the piston and piston 104, 106 rod, and a previous acceleration of the piston and piston rod, 104,106.

In a fourth control block 608, the frequency of the slope intercept condition is tracked. This enables a frequency measurement to be taken while the resonant frequency of the coaxial cavity 112 changes with cylinder extension.

In a fifth control block 610, a frequency measurement is taken. In the preferred embodiment, frequency measurements are taken by measuring the period of a predetermined number of cycles of the frequency signal. This occurs as follows, during frequency tracking (detection and tracking of a slope intercept condition), the output of the first Op Amp 426 (TP #1) changes from 1.0 volt to approximately 0.6 volt. In response, the window comparator 455 enables the prescaler 210. The latch 232 enables the first counter 234. The first counter 234 counts the output pulses of the prescaler 210. When the first counter 234 begins counting, the second counter 236 is enabled. The first counter 234 counts a predetermined number of pulses and responsively stops the second counter 236. Preferably, the second counter 236 has a 16 MHz clock 240. The second counter 236 is then read by the sensor controller 228. The value of the second counter 236 indicates the period of a predetermined number of cycles of the output signal of the prescaler and, therefore, the period of a predetermined number of cycles of the signal received from the cavity 112. The period therefore is also indicative of the average frequency of the signal transmitted into the cavity during frequency tracking.

In a sixth control block 612, the position of the piston and piston rod 104,106 is determined as a function of the measured average frequency, as discussed above. The sensor controller 228 then determines the position of the piston and piston rod 104,106 by a memory lookup table.

Control then returns to the first control block 602 and the cycle is repeated.

With reference to FIG. 7, in another embodiment of the present invention, the sensor 102 detects a positive-slope intercept condition and a negative slope intercept condition and responsively determines the position of the piston and piston rod 104,106.

In a seventh control block 702, the sensor 102 is RESET.

In an eighth control block 704, an electromagnetic signal is transmitted into the coaxial cavity 112. The frequency of the signal begins at a predetermined minimum value and increases toward a predetermined maximum value. The rate of increase is determined by the integrating means 220 and first and second VCOs 202,204.

As the frequency increases and the resonant frequency of the coaxial cavity is neared, the magnitude of the received signal increases.

In a ninth control block 706, a positive slope intercept condition is detected, that is, the magnitude of the received signal is substantially equal to a predetermined threshold value.

In a tenth control block 708, the frequency of the transmitted signal is measured. In a preferred embodiment, the frequency is measured as above.

In an eleventh control block 710, the frequency of the signal transmitted into the coaxial cavity 112 is increased. This is to ensure that the sensor ramps toward the negative slope intercept condition rather than locking onto the positive slope intercept condition again.

In an twelfth control block 712, the frequency of the transmitted signal begins to ramp towards the negative slope condition.

In a thirteenth control block 714, a negative slope intercept condition is detected, that is the magnitude of the received signal is substantially equal to the predetermined threshold.

In a fourteenth control block 716, the frequency of the transmitted signal is measured.

In a fifteenth control block 718, the position of the piston is determined as a function of the measured frequencies.

In a first embodiment, the period corresponding first positive slope intercept condition of the coaxial cavity 112 is first determined (see above). The sensor controller 228 then determines the position of the piston and piston rod 104,106 by a memory lookup table.

In a second embodiment, the position of the piston 104 is determined by equation 2A or 2B. Equations 2A and 2B may need to be adjusted:

$$P_r = A * P_n$$

where A is a parameter based on cylinder dimensions, the dielectric constant of the fluid and the position of the cylinder.

Control then returns to the seventh control block 702 and the cycle is repeated.

With reference to FIGS. 5, 8A, and 8B, in a preferred embodiment the sensor 102 detects first positive and negative slope intercept conditions and second positive and negative slope intercept conditions and responsively determines the linear extension or position, velocity, and acceleration of the piston 104.

In a sixteenth control block 802, the sensor 102 is reset (RESET). During RESET, the first and second counters 234,236 and the integrating means 220 are reset. As shown by the first and second trace lines 502,504 of FIG. 5, this corresponds to the RESET line (signal Cl) being LOW. At the beginning of the cycle (t=0), the INTERCEPT line (signal C2) is HIGH, indicating a search for a positive slope intercept.

During RESET, the third and fourth switches 460, 462 are closed. As a result of the third switch 460 being closed, the negative input terminal of the third Op Amp 450 is connected to ground, forcing the output HIGH (approximately 20 V). The frequency of the signal transmitted by the first and second VCOs 202,204 is controlled by the output of the third Op Amp 450 (VCO Control) and is, preferably, inversely proportional to VCO Control.

As a result of the fourth switch 462 being closed, the fourth Op Amp 464 is activated, forcing the output of the first Op Amp 428 to approximately one volt.

In a seventeenth control block 804, an electromagnetic signal is transmitted into the coaxial cavity 112. The frequency of the signal begins at a predetermined minimum value and increases toward a predetermined maximum value. The rate of increase is determined by the integrating means 220, VCO Control, and the first and second VCOs 202,204.

The sensor controller 228 begins frequency ramp up by changing the C1 from LOW to HIGH at time $t=t_1$. The third and fourth switches 460,462 are opened, thereby, allowing the output of the third Op Amp 450 to ramp down and disabling the autozero feedback loop, respectively.

In an eighteenth control block 806, a first positive slope intercept condition is detected (positive lock). The fifth trace 510 represents the output of the detecting means 214. As the frequency of the electromagnetic signal nears the resonant frequency of the cavity, the magnitude output of the detecting means 214 increases. The first positive slope intercept condition occurs when the output of the detecting means is substantially equal to or greater than $V_{TH}$.

When positive lock has occurred the output of the first Op Amp 426 changes from one volt to approximately 0.6 volt, as shown by a fourth trace 508.

In a nineteenth control block 808, the first positive slope intercept condition is tracked.

In order to determine the linear position of the piston 104, a frequency measurement must be made. During the measurement, the piston 104 may be in motion, thereby, changing the resonant frequency of the coaxial cavity 112. By allowing the frequency of the transmitted signal to vary and the receiving section 116 to track the positive slope intercept condition, a more accurate frequency reading is achieved.

In a twentieth control block 810, the frequency of the transmitted signal corresponding to the first positive slope intercept condition is determined. Preferably, this is done by counting a predetermined number of cycles, for example 256, of the transmitted signal during tracking of a positive lock and determining the period of the predetermined number of cycles (see discussion above). Since the resonant frequency of the cavity 112 and, therefore the transmitted frequency, may be changing, the measure period is inversely proportional to the average frequency during tracking of a positive lock. As shown in FIG. 5, positive lock occurs at $t_p$ and negative lock occurs at $t_n$.

In a twenty-first control block 812, the frequency of the transmitted signal is increased. This is to ensure that the sensor ramps toward the negative slope intercept condition rather than locking onto the positive slope intercept condition again.

The sensor controller 228 at $t=t_2$, changes C2 from HIGH to LOW. This initiates a search for a negative slope intercept condition. At $t=t_2$, the thirteenth capacitor 446 injects current into the negative input terminal of the third Op Amp 450, thereby lowering VCO Control. Also, the first switch 444 is closed, activating the second Op Amp 432 and thereby inverting the gain of the feedback loop.

In a twenty-second control block 814, the frequency of the transmitted signal begins ramp towards the negative slope intercept condition. In a twenty-third control block 816, a first negative slope intercept condition is detected (negative lock).

By inverting the gain of the feedback loop, the output of the third Op Amp 450 will converge to the negative lock condition.

In a twenty-fourth control block 818, the first negative slope intercept condition is tracked.

In a twenty-fifth control block 820, the period, P2, of a predetermined number of cycles of the transmitted frequency during tracking of a negative lock are determined.

In a twenty-sixth control block 822, the sensor is RESET. In twenty-seventh through thirty-fifth control blocks 824–840, the above procedure is repeated to determine periods, P3 and P4, for second positive and negative slope intercept conditions, respectively.

In a thirty-sixth control block 842, the position, velocity, and acceleration of the piston 104 are determined.

The position of the piston 104 is determined by:

$$A1*(P1+P2+P3+P4), \qquad \text{EQU. 3}$$

where A1 is a parameter based on cylinder position and dimensions and the dielectric constant of the fluid within the cylinder.

The velocity of the piston 104 is determined by:

$$A2*[(P1-P3)/(T3-T1)-(P2-P4)/T4-T2)], \qquad \text{EQU. 4}$$

where A2 is a parameter based on cylinder position and dimensions and the dielectric constant of the fluid within the cylinder.

The acceleration of the piston 106 is determined by:

$$A3*[(P1-P3)/(T3-T1)-(P2-P4)/T4-T2)]/(T1+ \qquad \text{EQU. 5}$$

$$T3-T2-T4),$$

Control then returns to the sixteenth control block 802 and the cycle is repeated.

With reference to FIGS. 9A and 9B, in an alternate preferred embodiment, the sensor 102 detects a positive slope intercept condition and takes two period measurements, detects a negative slope intercept condition and takes two period measurements and responsively determines the linear extension (position), velocity, and acceleration of the piston 104.

In a thirty-seventh control block 902, the sensor 102, is RESET. In a thirty-eight control block 904, an electromagnetic signal is transmitted into the coaxial cavity 112. The frequency of the signal begins at predetermined minimum value and increases toward a predetermined maximum value. In a thirty-ninth control block 906, a positive slope intercept condition is detected. In a fortieth control block 908, the positive slope intercept condition is tracked. In a forty-first control block 910, the period of a predetermined number of cycles of the transmitted signal during tracking of a positive lock is determined. The determined period, P1, is an indication of the average frequency during positive lock (see discussion above).

In a forty-second control block 912, the sensor 102 delays and in a forty-third control block 914, a second period, P3, is determined.

In a forty-fourth control block 916, the frequency of the transmitted signal is increased. The frequency of the transmitted signal is then ramped toward the negative slope intercept condition (forty-fifth control block 918). In forty-sixth and forty-seventh control blocks 920,922 a negative slope intercept condition is detected and tracked. A first period, P2, is determined in a forty-eighth control block 924. After a delay (forty-ninth control block 926), a second period, P4, is determined (fiftieth control block 928).

To maximize measurement accuracy of the velocity and acceleration measurements, the intervals between T1, T2, T3, and T4 should be long as possible.

In a fifty-first control block 930, the position, velocity, and acceleration of the piston 104 is determined by EQUs. 4,5, and 6, respectively.

Control then returns to the thirty-seventh control block 902 and the cycle is repeated.

The sensor's 102 timing may be asynchronous or synchronous.

In the asynchronous mode, the prescaler is enabled during the entire measurement interval. When the sensor controller 228 is ready to measure a period, there is a delay until a transition of the prescaler output occurs. At this time, period measurement begins. In the asynchronous mode T1, T2, T3, and T4 vary both with respect to the sensor controller 228 cycle timing and with respect to each other (from one measurement to the next).

In the synchronous mode, an additional CLEAR command is needed. Before a period measurement, the counting means 230 is cleared and period measurement begins after the CLEAR is removed (enabling the counter). In the scheme, times T1, T2, T3, and T4 will be fixed with respect to the system controller 228 cycle timing and each other from one measurement to the next.

Industrial Applicability

With reference to the drawings and in operation, the RF linear position sensor 102 is adapted to determine the linear extension, velocity and acceleration of a hydraulic cylinder 108 for the purpose of providing feedback to an external control system.

The external control system uses information regarding a plurality of cylinders from respective sensors. Each sensor includes a transmitting section, a receiving section and a controlling means. However, each sensors' controlling means may be part of a master controlling means implemented on a single microprocessor.

Preferably, the microprocessor will determine the position, velocity, and acceleration of each hydraulic cylinder once during a control loop. The control loop is typically measured in milliseconds (ms), for example, 20 ms.

Each sensor will be started at the same time. When a slope intercept condition has been detected and the period measure the controller will read the appropriate counter. After each cycle, the controller will calculate the position, velocity, and acceleration of each cylinder and store the data in memory.

In the preferred embodiment, the resonant frequency of the cylinder will be determined as a function of the measure frequency or period corresponding to the positive and negative slope intercept conditions. At certain cylinder positions, however, due to the cylinder geometry, negative lock may not be achieved. For those positions, the resonant frequency will be determined by the positive lock condition only.

The external control system signals the controlling means whenever updated information is needed. The most recent data will then be transmitted to the external control system.

Furthermore, since the position of each cylinder is determined as a function of the measure periods, which are time based, the position information may also be used as an indication of the time at which the readings were taken.

Other aspects, objects, and advantages of the present invention can be obtained from a study of the drawings, the disclosure, and the appended claims.

We claim:

1. A method for detecting a linear position of a piston (104) and a piston rod (106) being movable within a housing (110) of a hydraulic cylinder (108), including the steps of:

producing an electromagnetic signal having a frequency varying between minimum and maximum values;

delivering said electromagnetic signal into said hydraulic cylinder (108);

receiving electromagnetic wave signals from said hydraulic cylinder (108);

detecting a first positive slope intercept condition;

tracking the frequency of said first positive slope intercept condition and responsively producing a first frequency signal;

detecting a first negative slope intercept condition;

tracking the frequency of said first negative slope intercept condition and responsively producing a second frequency signal;

detecting a second positive slope intercept condition;

tracking the frequency of said second positive slope intercept condition and responsively producing a third frequency signal;

detecting a second negative signal slope intercept condition;

tracking the frequency of said second negative slope intercept condition and responsively producing a fourth frequency signal;

receiving said frequency signals and responsively determining the position, velocity and acceleration of said piston and piston rod (104,106).

2. A method, as set forth in claim 1, wherein said piston (104), piston rod (106) and housing (110) form a variable length coaxial cavity (112) and said electromagnetic wave signal is a transverse electromagnetic wave delivered into said coaxial cavity (112).

3. An apparatus (102) for detecting a linear position, a linear velocity, and a linear acceleration of a piston (104) and a piston rod (106) being movable within a housing (110) of a hydraulic cylinder (108), comprising:

means (14) for producing an electromagnetic signal and delivering said electromagnetic signal into hydraulic cylinder (108), said electromagnetic signal having a frequency varying between predetermined minimum and maximum values;

means (116) for sensing an electromagnetic wave signal within said hydraulic cylinder (108), detecting first and second positive slope intercept conditions and first and second negative slope conditions of said electromagnetic wave signal and producing first and third and second and fourth frequency signals in response to the frequency of said electromagnetic signal corresponding to said first and second positive slope conditions and said first and second negative slope conditions, respectively; and means (118) for receiving said first, second, third, and fourth frequency signals and responsively determining the position, velocity, and acceleration of said piston (104) and piston rod (106).

4. An apparatus (102), as set forth in claim 3, wherein said piston (104), piston rod (106), and housing (110) define a variable length coaxial cavity (108) and said electromagnetic signal is a transverse electromagnetic wave.

5. An apparatus (102), as set forth in claim 3, wherein said slope intercept conditions detecting means includes means for tracking the frequency at which said first and second positive slope conditions and said first and second negative slope conditions occur.

6. An apparatus (104), as set forth in claim 5, wherein said position, velocity, and acceleration determining means includes means for determining first, second, third, and fourth periods of a predetermined number of cycles of said first, second, third, and fourth frequency signals.

\* \* \* \* \*